United States Patent Office 3,375,301
Patented Mar. 26, 1968

3,375,301
POLYMER COMPOSITIONS FROM VINYL MONOMERS AND UNSATURATED POLYESTER-POLYETHER COPOLYMERS
Leslie C. Case and Laura K. Case, both of 14 Lockeland Road, Winchester, Mass. 01890
No Drawing. Continuation-in-part of application Ser. No. 168,062, Jan. 23, 1962. This application Oct. 7, 1965, Ser. No. 493,933
26 Claims. (Cl. 260—869)

ABSTRACT OF THE DISCLOSURE

Novel ethylenically unsaturated polyester-polyether resins capable of copolymerizing with vinyl monomers are prepared by the reaction of an unsaturated anhydride with an alkylene oxide in the presence of a polymerization starter selected from the group consisting of water, hydrogen sulfide, inorganic monomeric phosphorous-containing acids and organic compounds having a hydroxyl, carboxyl or sulfhydryl radical. The resins are prepared in the absence of other catalysts.

---

This application is a continuation-in-part of our copending applications Ser. No. 168,062, filed Jan. 23, 1962, now abandoned, Ser. No. 195,999, filed May 19, 1962, now abandoned, and Ser. No. 456,816, filed May 18, 1965.

This invention relates to improved resinous compositions. More specifically, this invention is concerned with cross-linked, infusible resinous compositions prepared by copolymerization of vinyl monomers with novel polyester-polyether copolymers having substantial internal unsaturation.

These new compositions are useful in the preparation of extraordinarily tough, hard, resilient and flexible castings, coatings and laminates.

Unsaturated polyesters, generally containing maleic or fumaric acid ester linkages, are widely used in combination with vinyl monomers in formulating casting and laminating resins. A wide variety of such polyesters is available commercially, and suitable formulations for various applications are well known in the trade. The cheapest resin formulations, finding extensive use in boats, corrugated sheets and other general purpose applications, are based on polyesters derived from maleic anhydride, phthalic anhydride and propylene glycol. Polyesters of this type are very viscous and their use in laminating and casting resin formulations leads to brittle, rigid products. More expensive formulations have been developed for applications which require greater toughness, such as patching compounds. The flexibility and toughness of the final product can be increased through use of a polyester which contains flexible aliphatic segments. Dibasic aliphatic acids, such as adipic acid, have been used for this purpose. Because of the high cost of aliphatic dibasic acids such polyesters are considerably more expensive. Substitution of longer chain diols for propylene glycol is also frequently used to prepare suitable polyesters for use in preparing tough flexible resins. Diethylene glycol, triethylene glycol and dipropylene glycol are frequently used. However, polyesters made with these glycols are significantly more costly than those derived from propylene glycol. Long-chain aliphatic diols, such as 1,5-pentanediol and 1,6-hexanediol are seldom used because of their cost, despite the fact that their use gives products with excellent properties. An added disadvantage of such polyesters is their objectionably high viscosity at only moderate molecular weights which leads to processing difficulties, such as poor wetting of glass fibers, slow removal of entrapped air, and poor filling out of complex-shaped molds.

It is the object of this invention to provide resilient or flexible cross-linked laminating and casting resin compositions of superior toughness, which are conveniently and economically produced from low-cost ingredients by utilizing, in combination with vinyl monomers, novel high-molecular-weight unsaturated polyester-polyether copolymers containing flexible aliphatic ether chain segments. These novel copolymers allow the facile, ready incorporation of certain very desirable acidic components and it is a further objective of this invention to provide fire-retardant compositions. It is a still further objective of this invention to provide resin formulations which undergo little shrinkage on curing. In addition, use of these copolymers makes readily available nearly colorless products from various acids which are normally associated with severe product discoloration. These novel unsaturated polyester-polyether copolymers also have very desirable viscosity properties which lead to ease of processing and to improved properties of the final product.

The polymeric resin formulation components provided herewith are complex in structure and contain both ester and ether linkages in substantial and generally random proportions. They are broadly defined as unsaturated polyester-polyether copolymers since they contain polyester units and polyether, e.g. polyoxyalkylene, segments. Each polymer molecule may be mono- or polyfunctional, and has acid or hydroxyl termination on the chain ends, that is the polymer chain end groups consist of either carboxylic acid groups or aliphatic hydroxyl groups. The molecular weight of these polymers will be at least about 2000, and preferably at least 4000, and in some instances will be 10,000 or even higher. A very important characteristic of the polyester-polyether polymers useful in this invention is that they possess a relatively narrow molecular-weight distribution, approximating a Poisson distribution, in contrast to the geometric molecular-weight distribution of polymers produced by polycondensation, using polyether glycols and dibasic acids.

The linear polymer chains of the novel polyester-polyether copolymers provided as components for the formulation of the cured resins of this invention are substantially composed of the essential structural repeating unit of the general formula:

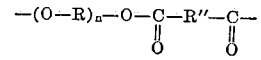

wherein R is a 1,2-alkylene or 1,3-alkylene radical and —O—R— is a 1,3-oxyalkylene or 1,4-oxyalkylene radical derived from a cyclic monoether such as an epoxide or oxetane, by a ring-opening reaction, $n$ is the degree of homopolymerization in the polyoxyalkylene segment and is a positive whole number varying from at least one to more than six with the arithmetic average value of $n$ (arrived at by adding the number of individual oxyalkylene groups and dividing this sum by the number of polymer chain segments composed of oxyalkylene groups) being at least 1.25 and preferably at least 2.0 and generally not more than 4, R' is an unsaturated aliphatic hydrocarbon radical having at least two and usually not more than ten carbon atoms and containing ethylenic unsaturation reactive towards copolymerization with vinyl monomers.

A portion of the ester functions in the copolymers may also be linked by groups derived from aromatic or saturated aliphatic dicarboxylic acids, or unsaturated dicarboxylic acids unreactive in free-radical reactions. The polymer chains of such unsaturated polyester-polyether copolymers will also contain, interspersed with the above structural units, structural units of the general formula:

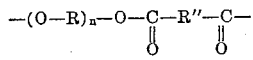

where R, —O—R—, and $n$ have the same significance assigned previously and R″ represents a hydrocarbon radical connecting two carboxylic ester functions and being selected from the group consisting of aromatic, saturated aliphatic and unsaturated radicals unreactive in free-radical copolymerization with vinyl monomers.

The linear polyester-polyether polymer chains originate from and are connected through ester and ether linkages to a central core which is derived from a compound selected from the group consisting of water, monomeric inorganic phosphorous-containing compounds and organic compounds having at least one radical selected from the group consisting of hydroxyl, carboxyl and sulfhydryl radicals.

The novel polyester-polyether copolymers which are used to prepare the resinous compositions of this invention are produced by copolymerizing the cyclic anhydride of an organic polycarboxylic acid having ethylenic unsaturation which is free-radical reactive, a cyclic monoether and a non-basic active hydrogen-containing compound. The cyclic anhydride of a saturated aliphatic, aromatic, or organic polycarboxylic acid having olefinic linkages unreactive in free-radical reactions may be included in the copolymerization.

The novel unsaturated polyester-ether polymeric components of the cured compositions of this invention are prepared by the process described in our copending applications Ser. No. 168,062, filed Jan. 23, 1962, and Ser. No. 456, 816, filed May 18, 1965, which are hereby included by reference. According to this process, suitable polyester-ether polymers are produced by copolymerizing at superatmospheric pressure and at a temperature of from room temperature to about 200° C. (1) a cyclic monoether selected from the group consisting of terminal aliphatic epoxides and oxetanes, (2) a cyclic monoanhydride of an organic polycarboxylic acid selected from the group consisting of anhydrides containing free-radically reactive ethylenic unsaturation and mixtures thereof with other anhydrides having from four to fourteen carbon atoms, said mixtures containing at least about 25 mol percent of the ethylenically unsaturated cyclic monoanhydride, and 3) a polymerization starter. Suitable polymerization starters which can be used comprise the group consisting of water, hydrogen sulfide, monomeric inorganic phosphorous-containing acids and organic compounds having at least one substituent selected from the group consisting of hydroxyl, carboxyl, and sulfhydryl radicals and aqueous mixtures thereof. Examples of suitable monomeric inorganic phosphorous-containing acids are phosphoric and phosphorous acids. The preferred organic polymerization starters comprise the group consisting of aliphatic alcohols, organic carboxylic acids and hydroxy carboxylic acids. Aliphatic alcohols having from one to 18 carbon atoms and from one to 8 hydroxyl groups and organic carboxylic acids having from one to 54 carbon atoms and from one to four carboxylic acid groups are especially useful as polymerization starters.

Representative useful alcoholic polymerization starters are monoalcohols, such as methanol, ethanol, propanol, butanol, amyl alcohol, octanol, glycols, such as ethylene glycol, propylene glycol, butylene glycol, polyether glycols, such as diethylene glycol, triethylene glycol, dipropylene glycol, tripropylene glycol, higher polyols such as glycerol, 1,2,6-hexanetriol, trimethylolpropane, pentaerythritol, dipentaerythritol, tripentaerythritol, sorbitol, mannitol, inositol, and methyl glucoside. The polymeric ethylene oxide and propylene oxide adducts of polyols may also be used as polymerization starters.

Examples of organic carboxylic acids and hydroxycarboxylic acids which may be used as polymerization starters are acetic acid, propionic acid, butyric acid, maleic acid, succinic acid, glutaric acid, adipic acid, hydroxyacetic acid, aconitic acid, citric acid, tartaric acid, malic acid, gluconic acid, tricarbollylic acid, isophthalic acid, trimellitic acid, pyromellitic acid, linoleic acid, linoleic acid dimer, linoleic acid trimer, tall oil fatty acid, oleic acid, and others.

Representative sulfhydryl-group containing compounds useful as polymerization starters comprise aliphatic mono- and polythiols, especially alkyl mercaptans containing up to 12 carbon atoms, alpha-mercaptoacetic acid, alpha-mercapto- and beta-mercapto-propionic acids and esters of these acids with organic alcohols.

The cyclic monoethers suitable for preparing the polyester-ether resin components may be selected from the group consisting of epoxides and oxetanes. Preferred among the suitable epoxides are the saturated lower terminal epoxides of the formula

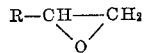

wherein R is a radical of the group consisting of hydrogen, lower alkyl radicals having from one to four carbon atoms and lower haloalkyl radicals. Very useful epoxides are ethylene oxide, propylene oxide, 1,2-butylene oxide, and epichlorohydrin. Examples of other suitable epoxides are cyclohexene oxide, styrene oxide, cyclopentadiene monoepoxide, and vinylcyclohexene monoepoxide. Examples of suitable oxetanes are trimethylene oxide, 3,3-dimethyl trimethylene oxide, and 3,3-bis(chloromethyl)-trimethylene oxide. Mixtures of cyclic ethers may be used. The preferred cyclic ethers for use in this invention are ethylene oxide, propylene oxide, and 1,2-butylene oxide.

Although suitable polyester-polyethers may be prepared by copolymerizing unsaturated epoxides, such as allyl glycidyl ether, with saturated anhydrides, such as succinic anhydride, this approach is not favored because of the higher cost of the raw material.

Cyclic anhydrides of ethylenically unsaturated polycarboxylic acids which are free-radical reactive, that is in which the ethylenic unsaturation when incorporated into a polyester is capable of entering into copolymerization with unsaturated monomers by a free-radical mechanism are suitable for use in this invention. Preferred are alpha-beta unsaturated anhydrides having from 4 to 5 carbon atoms. Particularly preferred for use in this invention is maleic anhydride. Other ethylenically unsaturated anhydrides, such as itaconic anhydride, are also useful in this invention.

Cyclic monoanhydrides of saturated aliphatic or aromatic polycarboxylic acids, or of unsaturated polycarboxylic acids which do not contain olefinic linkages reactive in free-radical reactions may be advantageously admixed with the ethylenically unsaturated free-radical reactive anhydride. Examples of such useful anhydrides are phthalic anhydride, tetrahydrophthalic anhydride, tetrachlorophthalic anhydride, tetrabromophthalic anhydride, trimellitic anhydride, endomethylene tetrahydrophthalic anhydride, 1,4,5,6,7,7-hexachlorobicyclo-(2,2,1)-5-heptene-2,3-dicarboxylic anhydride (hereinafter referred to as chlorendic anhydride), diphenic anhydride, succinic anhydride, dodecenylsuccinic anhydride, glutaric anhydride, and dichloromaleic anhydride. Preferred anhydrides are those having from 4 to 16 carbon atoms and from 0 to 6 halogen atoms. Particularly preferred for use in this invention are phthalic and tetrachlorophthalic anhydrides. If such anhydrides are used in admixture with the ethylenically unsaturated anhydrides they should be employed in amounts of not more than 75 mol percent of the anhyride mixture.

The copolymerization is effected by bringing the reactants together at elevated temperatures and superatmospheric pressure, advisably in a closed system, in a manner such that a substantial concentration of the monoepoxide is present intimately admixed with the other reactants during the time in which the major part of the reaction takes place. It is a critical requirement for the successful preparation of the polyester-polyether polymers suitable for use in this invention that the reactants are combined so that the ratio of equivalents of monoepoxide to the sum of equivalents of acid groups plus one-half the equivalents of anhydride groups in the reaction mixture is at least 0.3 and generally at least 1.0 during the time in which at least 50 percent and generally at least 75 percent of the polymerization takes place. A maximum of six equivalents of monoepoxide in this same ratio is generally used. For purposes of this invention one equivalent of cyclic ether is taken to be one mol of cyclic ether, and one equivalent of acid or anhydride is taken to be equal to that amount which is required to neutralize one mol of sodium hydroxide, e.g. one equivalent of acid group is equal to one gram mol of carboxylic acid divided by the number of carboxylic acid groups per mol, and one mol of anhydride equals two equivalents, so that one-half the number of equivalents of anhydride present generally equals the number of mols present. It should be clearly understood that in order to prepare polyols suitable for use in this invention it is absolutely essential that the reactants are combined such that a substantial epoxide concentration is always present during the time in which the major amount of the polymerization takes place. While it is frequently convenient to combine all the reactants initially before heating the reaction mixture, and while it is advisable that the total amount of the polymerization starter is present at the start of the reaction, it is to be understood that the entire amount of epoxide or all of the anhydride does not have to be present at the start of the reaction but that these reactants may be suitably added in a few sizable batch-wise portions during the course of the polymerization. For example, if desired, a substantial portion of the ethylenically unsaturated cyclic anhydride can be added after the reaction has already proceeded to a large extent, and thus is reacted with the polymer previously formed using part of the total anhydride reactant. Such a mode of operation places the reactive double bonds near the ends of the polymer chains, and thus assures more complete cross linking and thus better physical properties in the final cured product. To produce the polyester-polyether polymers suitable for use in this invention it is absolutely essential, however, to avoid a mode of operation in which the epoxide is added in a large number of small increments, such as in a drop-wise fashion, as this will result in an extremely viscous or glassy polymer which has essentially no polyoxyalkylene segments.

A temperature of 70° C. or higher is usually used, although a temperature above 200° C. is generally not required and may lead to adverse results. For many systems suitable temperatures range from about 100° C. to 180° C., and frequently from about 120° to 160° C. If halogenated anhydrides, such as chlorendic anhydride, are used, or a phosphorous-containing acid is used as polymerization starter, temperatures as low as 70° C. will frequently be sufficient. The polymerization of a few extremely reactive systems may proceed exothermically at room temperature. With some reactants the polymerization once in progress may become exothermic enough so as to require cooling to keep the reaction mixture within the desired temperature range.

The process of this invention is advisably conducted in a closed system at superatmospheric pressure, such as autogenous pressure. A minimum pressure of 1.5 atmospheres is advisably used, and in most cases pressures will vary from at least about 50 pounds per square inch to about 300 pounds per square inch. The polymerization can be effected batch-wise, in a closed vessel, such as an autoclave equipped with agitation, or under continuous conditions in a tubular reactor at elevated temperatures. Because of the acidic nature of the reaction mixture equipment of sufficient corrosion resistance must be employed. The polymerization is generally completed within a few minutes to several hours, with the exact time depending on the nature of the reactants, catalyst and temperature used.

If desired, a polyester-polyether copolymer can be prepared by first reacting a saturated, or non-free radical reactive unsaturated, cyclic anhydride with the epoxide and polymerization starter to produce an intermediate hydroxyl-terminated polymer which can serve as a polymerization starter and which is then reacted in a second stage with an ethylenically unsaturated anhydride reactive in free-radical reactions, such as maleic anhydride. An epoxide can be used along with the maleic anhydride if desired. When a polymer is prepared in the first stage having only hydroxyl end groups and an amount of maleic anhydride equivalent to the terminal hydroxyl end groups is used, the chain ends of the final polymer will consist of half esters of maleic acid. A structure of this sort is ideal for optimum cross-linkage (see Example 6 infra). If more cyclic ether is used along with the maleic anhydride, the polymer will have an unsaturated polyester-ether block in the terminal portion of the polymer chains.

In preparing the unsaturated polyester-polyether copolymers about 2.0–6.0 mols of cyclic monoether per mol of anhydride should be employed. In the case of many cyclic monoethers, 2.0–3.0 mols of cyclic ether per mol of anhydride is preferred. For ethylene oxide, the preferred amount is about 2.5–4.0 mols of ethylene oxide per mol of anhydride. The lower values give predominantly carboxyl end groups, whereas the higher values yield predominantly hydroxyl end groups.

The amount of polymerization starter to be used depends on the desired polymer molecular weight. The amount of starter is determined by the relation:

$$\text{Mols of starter} = \frac{\text{Total weight of reactants incorporated}}{\text{Molecular weight of polymer}}$$

The reactants used in the production of the polyester-polyether copolymers, used as components in the resin formulations of this invention, are added in amounts and ratios such that polymers are obtained containing an average of about 0.9 to about 5.0, and advisably about 1.5 to about 4.5 gram-mols of reactive olefinic linkages (double bonds) per kilogram of polymer, and also so that the polymers contain an average value of at least 1.1, and advisably of about at least 1.3, and frequently 2.0, ether oxygens per aliphatic chain segment, viz., between ester groups. Otherwise stated, the average degree of polymerization in the ether segment can be as high as 5, and often is 2.1 or higher. The main chain linking two ester groups should contain an average of 5 to 15, and advisably 6 to 11 atoms, including the ester oxygens.

Although no catalyst is required in the preparation of the polyester-ether polymers it has been found that moderately strong acids exert a catalytic effect, and if such acids or their anhydrides are used the process becomes autocatalytic. For example, if halogenated anhydrides or phosphoric acid starter are employed, the polymerization takes place at significantly lower temperatures, resulting in polymers with considerably improved color. Although no catalysts are required, it has been found advantageous in some instances to use small amounts of catalysts of the type disclosed in our copending application Ser. No. 336,067, filed Jan. 6, 1964, in order to achieve faster reaction at lower temperatures and thereby avoid excessive color formation. Particularly useful for this purpose are stannous and cobaltous salts of organic carboxylic acids, such as cobaltous octoate and stannous octoate, and alkoxy titanates, such as tetraisopropyl titanate. Such catalysts, when used, are generally employed in amounts of about 0.01 to 0.1 percent by weight of the reaction mixture. It should be noted in this regard that in order to produce polymers suitable for use in this invention it is essential to avoid the presence of strongly basic catalysts, such as amines, quaternary ammonium hydroxides and inorganic hydroxides of alkali and alkaline earth metals as well as salts of these metals which exhibit basic properties. The presence of such substances appears to alter the course of the reaction and results in an extremely viscous or glassy polymer having essentially no polyoxyalkylene segments, plus unreacted starting materials, if the reactants are employed in the proportions set forth herein.

Useful polyester-polyethers produced by the process described above may be represented by the general structural formula:

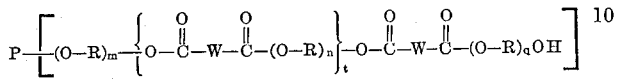

wherein $m$ and $q$ are integers varying from zero to generally not more than about 10, $n$ is a positive integer having a value varying from one to more than six, with the average value of $n$ varying from about two to four, $t$ is a positive integer having a value of at least one up to about 100, and $f$ is identical with the functionality of the polymerization starter and is a positive integer varying from one to about 8, P is the residue of the polymerization starter of functionality $f$ selected from the group consisting of water, hydrogen sulfide, inorganic monomeric phosphorous-containing acids and organic compounds having at least one radical of the group consisting of hydroxyl, carboxyl, and sulfhydryl radicals, which starter reacted to initiate polymer chains and became joined thereby through ester and ether linkages to said polymer chains, R is selected from the group consisting of 1,2-alkylene radicals and 1,3-alkylene radicals having not more than six carbon atoms, and W is a hydrocarbon radical selected from the group consisting of free-radical reactive ethylenically unsaturated radicals, such as 1,2-ethenylene, e.g. —CH=CH—, and 1,2-propenylene, e.g.

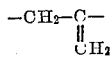

and mixtures containing at least 25 mol percent of said ethylenically unsaturated radicals with not more than 75 percent of hydrocarbon radicals having from two to fourteen carbons atoms and from zero to six halogen radicals, such as 1,2 - phenylene, 3,4,5,6-tetrahydro-1,2-phenylene, 3,4,5,6 - tetrachloro - 1,2-phenylene, 3,4,5,6-tetrabromo - 1,2 - phenylene, 1,4,5,6,7,7 - hexachloro-bicyclo - (2,2,1) - 2,3 - heptenylene-5, 2,2'-biphenylene, 1,2-ethylene, 1,3-propylene, and 1,2-dichloro-1,2-ethenylene.

The unsaturated polymer resin components always contain ether segments which are composed of a mixture of monooxyalkylene, dioxyalkylene, trioxyalkylene, and higher polyoxyalkylene units. The polymers described herein thus contain substantial quantities of polyesters of polyether glycols, such as di-, tri-, and tetraethylene glycols, or di-, tri-, and tetrapropylene glycols. These polyether segments impart desirable flexibility and toughness to the final resin compositions. However, since the polyether segments are made during the preparation of the polymers by the homopolymerization in situ of the cyclic monoether molecules, the cost of introducing these polyether segments is much less than by using polyether glycols as reactants.

When maleic anhydride is used as a reactant the free-radically reactive unsaturated linkages in the polymer chains consist of maleate and fumarate linkages, the latter resulting from isomerization in varying extent depending on the acid number and the reaction conditions. Further isomerization can be achieved by heating the polymer for prolonged periods of time. Despite the fact that the instant polyester-ethers frequently contain substantial amounts of maleate linkages, satisfactory reactivity in copolymerization with vinyl monomers is unexpectedly observed.

Polyester-polyethers useful in the present invention are viscous fluids generally having bulk viscosities at room temperature of less than 1,000,000 centipoises, desirably less than 500,000 centipoises, and frequently less than 200,000 centipoises. The molecular weights of useful polymers generally range from at least 2,000, and preferably from at least 3,000 to more than 10,000, with the upper limit of the molecular weight range being determined solely by the requirements of desirable viscosity and handling ease. In general, the use of higher-molecular-weight polymers results in better physical properties of the cured resin. Another desirable characteristic which results in improved hydrolytic stability and low water absorption in the cured resins is the low acid numbers of the polyester-ethers. The acid numbers are generally less than 60, usually less than 30, and frequently are in the range of 10 to 20. Polymers having acid numbers of less than 5 can easily be prepared.

The unsaturated polyester-polyether resin components of this invention are further characterized by the fact that the polymer molecules have a relatively narrow molecular-weight distribution characteristic of ring-opening polymerizations. Since the temperature of polymerization is substantially below the temperature at which hydroxyl and carboxyl group reaction takes place to any extent, the resulting polymers frequently have a ratio of weight-average molecular weight to number-average molecular weight of less than about 1.5. These polymers differ therefore quite distinctly and sharply from polymers produced by polycondensation of polyether glycols and diacids.

The molecular weight per ethylenically unsaturated linkage ranges from about 250 to more than 1,000. Since the molecular weight of the resin components in the instant invention can be quite high, it is possible to produce for the first time unsaturated polymers having a very high molecular weight per unsaturated cross-linkable linkage, and thereby cross-linked cured resin compositions of very low cross-link densities. Quite unexpectedly and surprisingly, such cross-linked compositions exhibit excellent physical properties, such as toughness and elongation. These properties of the instant compositions are in direct contrast to the present state of the art which shows that if the molecular weight per cross link exceeds a value of about 500 the physical properties of the cured compositions are seriously impaired. An additional desirable feature of the unsaturated polymers possessing high molecular weight per unsaturation is the very low shrinkage observed on curing.

The cross-linked, infusible resinous compositions of the present invention are produced under conditions generally used in the art by cross linking the above-described novel polyester-ether polymers with vinyl monomers having one or more ethylenic bonds reactive in free-radical reactions. In accordance with standard techniques known to the art, the resinous compositions may be produced in the form of castings, laminates, and coatings.

Some of the unsaturated vinyl monomers useful for cross linking of our novel unsaturated polyester-polyether polymers include styrene, alpha-methyl styrene, methyl acrylate and alkyl methacrylates, such as methyl methacrylate, diallyl phthalate, indene, triallyl cyanurate, divinyl benzene, vinyl toluene, n-vinyl pyrrolidone, acrylamide, glycol diallyl ether, allyldiglycol carbonate, n-vinyl carbazole and others. Styrene and the substituted styrenes are particularly useful. Mixtures of unsaturated monomers may be used to advantage.

The cross-linked resin compositions are produced by reacting the vinyl monomer and the unsaturated polymer together under conditions in which free radicals are generated. The free radicals may be produced by the thermal decomposition of a free-radical initiator, such as benzoyl peroxide or azobis(isobutyronitrile), or by a redox reaction, such as that involving hydrogen peroxide and ferrous ion, or methyl ethyl ketone peroxide and cobalt ion, or by ionizing radiation, or by irradiation with ultraviolet rays, or by simple thermal activation. Any of the conventional means of free-radical generation useful in unsaturated polyester resin technology may be employed.

In general, the ratio of unsaturated vinyl monomer to polyester-polyether polymer used in the preparation of our novel resinous compositions is in the range conventionally used in the art. Thus, in reacting the unsaturated polyester-polyether copolymer with vinyl monomer, about one to four mols of vinyl monomer should be used for each gram mol of reactive ethylenic unsaturation in the copolymer. For practical formulations, this range of values corresponds to a weight ratio of vinyl monomer to unsaturated polymer component of from about 1 to 6 up to about 1 to 1. Specifically, our novel castings generally contain from about 20% up to as much as 60% by weight of unsaturated monomer, and generally from about 25% to 50%. As mentioned above, when low shrinkage is desired in the cured composition, polyester-polyether polymers with an especially high molecular weight per cross link may be used to advantage. In this application, the use of as little as 10 percent by weight of unsaturated monomer in combination with a polymer of relatively low unsaturation content is especially desirable.

Depending on the particular resin formulation the reaction mixture may also desirably contain other materials which are normally used in the art, such as pigments, dyes, fillers, skin-forming additives, compounding additives, promoters, inhibitors, retarders and the like.

The cured, infusible compositions of the present invention are flexible or resilient, cross-linked resins having moduli of elasticity of essentially less than 150,000 pounds per square inch. Because of the special qualities inherent in the novel polyester-ether components, the resinous formulations obtained in this invention are resilient and extraordinarily tough, and yield castings, coatings and laminates with excellent physical and chemical properties. One of the most outstanding advantages of the present compositions over those previously known to the art is the totally unexpected, remarkable toughness of the cured resins. The Izod impact strength values, the flexural strengths, the elongations and tensile strengths of our novel castings are generally greater by a considerable amount than those observed for conventional polyester resin castings. For typical conventional polyester castings the unnotched Izod impact strength values generally range from about two up to less than four ft. lbs. per inch, and the notched Izod impact strengths generally range from less than 0.2 to slightly more than 0.3 ft.-lb. per inch of notch. In sharp contrast thereto, the unnotched Izod impact strengths of our novel castings are generally well above six and frequently fall within the range of about ten to twenty ft.-lbs. per inch, and the notched Izod impact strengths of our new materials are generally at least 0.5, and frequently are at least 1.0, and sometimes fall within the region of 1.5 to 2, or higher. The examples illustrate specifically several castings having notched Izod impact strength values in the range of 1.0 to 2.0 ft.-lbs. per inch of notch.

The Shore A hardness values of the cured compositions of the present invention are usually at least about 85, and frequently range from about 90 up to about 99.

Surface coatings prepared according to the present invention also exhibit excellent mar and scratch resistance. Coatings prepared from resin components derived from ethylene oxide or trimethylene oxide are particularly noteworthy in this respect. The coatings of the present invention are suitable for application on wood, steel, non-ferrous metal surfaces, cement, and stone.

Another considerable advantage of the present invention resides in the fact that by employing such reactants as tetrachlorophthalic anhydride, tetrabromophthalic anhydride, or chlorendic anhydride in the preparation of the polyester-polyether resin component, fire-resistant, self-extinguishing castings, coatings, and laminates may be prepared quite readily and at low cost. The incorporation of such halogenated radicals into conventional polyesters is difficult and requires special catalysts, high reaction temperatures and very extended reaction times which result in poor color.

The flexible polyester-polyether copolymer components of the presently available rigid polyesters. Such blends of this invention are also particularly useful in blends with the rigid unsaturated polyesters now in commercial use. The rigid polyesters presently in use are made from maleic anhydride, phthalic anhydride or isophthalic anhydride, and a glycol. These rigid polyesters are quite inexpensive, but their great rigidity usually leads to brittleness and low fatigue strength in the cured products. The novel flexible polyester-polyether copolymers of this invention have about the same manufacturing cost as these rigid unsaturated polyesters. Consequently, blends of the rigid unsaturated polyesters with the novel unsaturated polyester-polyether copolymers in various proportions make available unsaturated resin components having any desired degree of flexibility, all at about the same low cost as that also offer considerable cost advantages over the semi-resilient and flexible unsaturated polyesters now in use. Blends employing polyether-polyester polymers derived from halogenated anhydrides are particularly useful in imparting some degree of fire resistance to the cured compositions. In general, the polyester-polyether content of desirable blends may range from about 10 percent to about 90 percent by weight of the polymer component which is reacted with the vinyl or unsaturated monomer.

The following examples are presented to illustrate the invention. However, many additional embodiments may be made of the concepts of this invention, and these embodiments are encompassed by the spirit of this invention.

*Example 1*

This example illustrates the preparation of a flexible casting based on a polyester-polyether from maleic anhydride, phthalic anhydride and polypropylene glycols, cross-linked by reaction with styrene.

Phthalic anhydride (21.0 grams), maleic anhydride (12.1 grams), propylene glycol (3.2 grams) and propylene oxide (49.1 grams) are sealed together in a heavy-walled tube. The mixture is heated at 120° C. for two hours, and 163° C. for eight hours. The product polyester-polyether is bright yellow in color and has an acid number of eight.

The above polymer (13.6 grams), styrene (6.4 grams), and benzoyl peroxide (0.3 gram) are mixed together and heated at 92° C. for two hours. The resulting product is a fairly soft rubber, and has a distinct yellow color.

*Example 2*

This example illustrates the preparation of a flexible casting based on a polyester-polyether from maleic anhydride, phthalic anhydride and propylene oxide, cross-linked by reaction with styrene. This polymer has improved color.

Maleic anhydride (19.2 grams), phthalic anhydride (29.6 grams), 85% phosphoric acid (2.9 grams), and propylene oxide (61.5 grams) are sealed together in a heavy-walled glass tube. The tube is then heated at 94° C. for 26 hours, 110° C. for six hours, and 121° C. for four hours. The product has a pale yellow color and an acid number of 57.

The above polymer is heated in a 190° F. oven to evaporate any volatiles. The devolatilized polymer (13.4 grams), styrene (5.7 grams), and benzoyl peroxide (0.2 gram) are mixed and heated at 99° C. for four hours. The product is a moderately firm, pale yellow rubber with very slow recovery.

*Example 3*

This example illustrates the preparation of another light-colored casting based on a polyester-polyether polymer derived from maleic anhydride, phthalic anhydride, and propylene oxide.

Maleic anhydride (9.9 grams), phthalic anhydride (14.5 grams), tetrachlorophthalic anhydride (1.2 grams), glycerol (1.6 grams), and propylene oxide (31.4 grams) are sealed together in a heavy-walled glass tube and heated at 110° C. for 15 hours, and at 121° C. for four hours.

The acid number at this point is 50. Then propylene oxide (7.0 grams) is added to the reaction mixture and the tube is resealed and heated at 108° C. for 15 hours and 127° C. for 2.5 hours. The acid number is now 22, and the polymer has a pale yellow color.

The polymer is devolatilized by heating at 95° C. The above polymer (13.5 grams) is mixed with styrene (5.4 grams) and benzoyl peroxide (0.25 gram). The mixture is heated at 95° C. for 70 minutes, and a pale yellow, soft rubber results.

*Example 4*

This example illustrates the preparation of a fairly stiff rubber from a polymer with a high maleic acid content.

Maleic anhydride (22.2 grams), tetrachlorophthalic anhydride (3.4 grams), 2,2-bis(4-hydroxyphenyl)propane (4.0 grams), and propylene oxide (37.4 grams) are sealed together in a heavy-walled glass tube and heated at 108° C. for 14 hours, 127° C. for 8 hours and 144° C. for 90 minutes. The product is a viscous, brown polymer.

The above polymer (20.4 grams) is mixed together with styrene (9.3 grams) and benzoyl peroxide (0.6 gram). The resulting mixture is heated at 95° C. for 70 minutes. The product is a moderately stiff rubber.

*Example 5*

This example illustrates the preparation of a tough, leathery casting from an unsaturated polymer with a high content of chlorendic acid.

Maleic anhydride (10.8 grams), chlorendic anhydride (26.6 grams), glycerol (1.5 grams), and propylene oxide (28.4 grams) are sealed together in a heavy-walled glass tube. The tube is heated at 85° C. for three hours, 102° C. for three hours, and 115° C. for two and one-half hours. The polymer is light brown and has an acid number of 50.

The above polymer is devolatilized and 8.9 grams are mixed with styrene (3.4 grams) and benzoyl peroxide (0.15 gram). The mixture is heated at 95° C. for 35 minutes. The product is a stiff, leathery rubber when cold.

*Example 6*

This example illustrates a two-step method of preparing an unsaturated polyester-polyether copolymer, especially suitable for fabricating semi-rigid castings, coatings, and laminates.

In the first step a hydroxyl-terminated polymer with a high content of aromatic rings is prepared by sealing together in a heavy-walled glass tube phthalic anhydride (56.0 grams), sorbitol (7.1 grams) and propylene oxide (61.5 grams), and heating the mixture at 156° C. for five hours. The resulting polymer (57.3 grams) is mixed with maleic anhydride (12.2 grams) and the mixture is heated at 125° C. for 14 hours. The resulting two-stage polymer is pale yellow in color and is quite viscous.

The above unsaturated polymer (14.9 grams) is mixed with styrene (6.3 grams) and benzoyl peroxide (0.2 gram), and the mixture is heated at 95° C. for two hours. The resulting casting is stiff, tough and light-colored.

*Example 7*

This example illustrates the preparation of an unsaturated polyester-polyether copolymer based on itaconic anhydride, and its polymerization with styrene.

Itaconic anhydride (23.9 grams), glycerol (3.6 grams) and propylene oxide (32.5 grams) are sealed together in a heavy-walled glass tube and heated at 140° C. for 18 hours.

The above polymer (12.1 grams), styrene (5.2 grams) and benzoyl peroxide (0.2 gram) are mixed together and heated at 90° C. for three hours. The resulting product is a moderately stiff rubber.

*Example 8*

This example illustrates the preparation of a casting based on a plyester-polyether copolymer derived from ethylene oxide.

Maleic anhydride (10.3 grams) and glycerol (2.5 grams) are placed into a heavy-walled glass tube, and the tube is cooled to −75° C. in a Dry Ice bath. Then ethylene oxide (17.1 grams) is added and the tube is sealed. The resulting mixture is heated at 134° C. for 17 hours.

The above polymer (6.9 grams) is mixed with styrene (3.0 grams) and azobis(isobutyronitrile) (0.2 gram). The mixture is cured at 67° C. for three hours. The resulting product is a resilient tough casting.

*Example 9*

This example illustrates the preparation of a coating based on a polymer prepared from maleic anhydride, tetrahydrophthalic anhydride and ethylene oxide.

Maleic anhydride (27.4 grams), tetrahydrophthalic anhydride (13.2 grams) and ethylene glycol (2.7 grams) are placed into a stainless steel bomb. Then ethylene oxide (58.3 grams) is weighed in, and the bomb is sealed, and the mixture is then heated at 126° C. for 22 hours.

The product of the above reaction (3.6 grams), is mixed with styrene (2.0 grams) and azobis(isobutyronitrile) (0.07 gram). The viscous mixture is flow-coated onto a glass plate and cured at 63° C. for six hours. The product is a hard, clear coating.

*Example 10*

This example illustrates the preparation of a laminate from an unsaturated polymer based on maleic and chlorendic anhydrides as prepared in Example 5.

The devolatilized polyester-polyether copolymer prepared in Example 5 (15.3 grams), is mixed with diallyl phthalate (7.8 grams) and azobis(isobutyronitrile) (0.3 gram). The viscous mixture is then brushed onto a six inch square piece of thick woven glass cloth in sufficient quantity so that the glass cloth is thoroughly wetted by the mixture, but there is no runoff of excess fluid. The piece is then pressed between flat steel plates in a press heated to 70° C. for a total of four hours.

The product is a stiff, tough, semi-transparent sheet.

*Example 11*

Into a 1-liter stirred stainless-steel pressure vessel is charged 11.1 grams of trimethylolpropane, 295.4 grams of maleic anhydride, 436.8 grams of propylene oxide, and 2.1 grams of stabilized stannous octoate (T–9). The vessel is heated to about 60° C. with stirring, and the heat is then turned off. At that point the reaction mixture undergoes an exothermic reaction which carries the temperature to a maximum of 123° C. in 43 minutes. The vessel is then allowed to cool for 1 hour and unloaded.

The cold product has a viscosity of about 100,000 centipoises at room temperature and a light straw color. Its molecular weight is about 10,000.

This product, 135.6 grams, is mixed with 59.1 grams of styrene, and 0.37 gram of azobis(isobutyronitrile). The mixture is heated until it becomes homogeneous and it is then cast in a 6-inch glass pie plate and cured at 65° C. for 8 hours. The casting is pale yellow, and has a gummy surface. The soft surface is removed with solvent before preparation of specimens for physical tests. The casting has a Shore A hardness of 97 to 98 on a machined surface. The unnotched Izod test samples do not break under an impact of 6 ft.-lbs. per inch. The notched Izod impact strength averages 1.18 ft.-lbs. per in. of notch for 4 specimens.

This example is repeated using 7.0 grams of glycerol in place of the trimethylolpropane with nearly identical results.

*Example 12*

The procedure and vessel are the same as those used in Example 11. The materials employed are 5.7 grams of trimethylolpropane, 102.4 grams of maleic anhydride, 162.2 grams of undistilled trimethylene oxide and 0.4 gram of stannous octoate. The vessel is heated to 85° C., from which point an exotherm carries the contents to a maximum temperature of 125° C. in 13 minutes. After cooling for 11 minutes, the vessel is opened and emptied.

The viscosity of the product is about 25,000 centipoises at room temperature, and the molecular weight is about 7,500. A casting is made from a mixture of 124.2 grams of the above polymer, 53.5 grams of styrene, and 0.51 grams of azobis(isobutyronitrile), the cure being for 12 hours at 65° C. The casting has a Shore A hardness of 90, and the surface is cured, demonstrating that air does not inhibit the cure of this polymer. The notched Izod impact strength of the casing averages 1.99 ft.-lbs. per inch of notch for 4 specimens, with only an incomplete break occurring on the impact.

The experiment was repeated twice, using 5.3 grams of trimethylolethane, and using 5.7 grams of 1,2,6-hexanetriol, respectively, in place of the trimethylolpropane. In both cases, the results were similar to those obtained above.

Example 13

The apparatus and procedure are the same as those used in Example 11. The materials used are 20.6 grams of trimethylolpropane, 104.7 grams of phthalic anhydride, 233.8 grams of maleic anhydride, 470.3 grams of propylene oxide, and 0.75 gram of stannous octoate. The vessel is heated to 95° C. from which point an exotherm proceeds to 168° C. in 17 minutes. The maximum pressure reached is 135 p.s.i. After cooling, to about 120 °C. the vessel is opened and emptied.

The cooled product has a viscosity of about 500,000 centipoises at room temperature and a pale straw color. The molecular weight is about 5000.

A casting is made by mixing 135.1 grams of the above polymer, 58.7 grams of styrene and 0.39 gram of azobis-(isobutyronitrile), and curing at 65° C. for 10 hours. The casting has a Shore A hardness of 95–96, and has a gummy surface. An unnotched Izod test specimen does not break under an impact of 6 ft.-lbs. per inch. The notched Izod impact strength averages 1.44 ft.-lbs. per inch of notch for 4 specimens.

Example 14

This example illustrates the two-stage process of preparing a block-copolymer unsaturated resin. The equipment and procedure used are the same as those used in Example 11. In the first step a trifunctional phthalic-polyoxypropylene polyester-polyether polymer of relatively low molecular weight is prepared. 18.3 grams of trimethylolpropane, 131.6 grams of phthalic anhydride, and 132.3 grams of propylene oxide are combined and heated in a pressure vessel to 140–150° C. for 1 hour. Then the reaction mixture is cooled to room temperature. In the second step, unsaturated polyester-ether blocks are added to the polymer branch chains of the above polymer which assumes the function of the polymerization starter. To the first-stage polymer is added 140.3 grams of maleic anhydride, 198.0 grams of propylene oxide, and 0.8 gram of stannous octoate. The vessel is then reheated to 105° C., and the heater is turned off. An exotherm takes place from this point, and raises the temperature to a maximum of 176° C. in 2 minutes. The vessel is allowed to cool, and is opened and emptied.

The viscosity of the polymer is about 500,000 centipoises at room temperature, and the molecular weight is about 5000.

A casting is prepared from the mixture of 133 grams of the polymer, 58.0 grams of styrene, and 0.40 gram of azobis(isobutyronitrile). The cure is 12 hours at 65° C. The casting has a gummy surface and a Shore A hardness of 97–98, when cold. However, this casting has a substantially lower flexural modulus than that of Example 11. The notched Izod impact strength has an average value of 1.32 ft.-lbs. per inch of notch for 4 specimens, and the sample seems to have a considerably better flexural strength than the casting of Example 11.

Example 15

This example illustrates the preparation of a polyester-polyether which takes place without external heating. The equipment and procedure are the same as used in Example 11. Maleic anhydride (395 grams), maleic acid (47 grams), and propylene oxide (450 grams) are the materials employed, the maleic anhydride being crushed before use. The maleic anhydride goes into solution on stirring at room temperature, and the acid does so somewhat more slowly. On continued stirring of the homogeneous solution at room temperature, an exotherm slowly develops and slowly raises the temperature to more than 100° C. The pressure first rises and then drops. Upon cooling, the polymer is viscous, and is bright yellow in color.

We claim:

1. A cured, cross-linked, tough resinous composition having from 10 to 60 percent by weight of residues of a vinyl monomer bonded by carbon-to-carbon bonds to residues of a flexible polyester-polyether copolymer which copolymerized through internal olefinic unsaturation with the unsaturated linkage of said vinyl monomer, said polyester-polyether copolymer before copolymerization with said vinyl monomer having a molecular weight of at least 2000 and having a ratio of weight-average molecular weight to number-average molecular weight of less than 1.5 and consisting essentially of linear polymer chains joined through linkages selected from the group consisting of ester and ether linkages to residues of a polymerization starter selected from the group consisting of water, hydrogen sulfide, and organic compounds having at least one radical selected from the group consisting of hydroxyl, carboxyl, and sulfhydryl radicals, said polymer chains being substantially composed of the essential repeating units

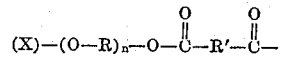

and

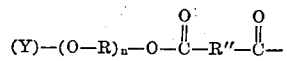

wherein R is selected from the group consisting of 1,2-alkyelne and 1,3-alkylene radicals having at least two and not more than 6 carbon atoms, $n$ is a positive integer having a value varying from one to about 10, with the average value of $n$ varying from at least 2.0 to about 4, R′ is selected from the group consisting of —CH=CH— and

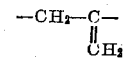

and

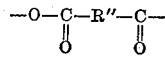

is a radical derived from an acid

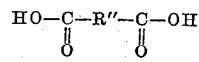

capable of forming a cyclic anhydride and having from 4 to 16 carbon atoms and from zero to six halogen substituents selected from the group consisting of chloro and bromo radicals, said (X) units being present in an amount such that the mol ratio $(X)/(X)+(Y)$ equals at least 0.25, said cured resinous composition having a Shore A hardness of at least about 85 and a notched Izod impact strength of at least about 0.5 ft.-lb. per inch of notch.

2. The resinous composition of claim 1 in which said vinyl monomer is selected from the group consisting of styrene, alpha-methyl styrene, vinyl toluene, methyl methacrylate, divinyl benzene, triallyl cyanurate, and diallyl phthalate.

3. A cured, cross-linked, tough resinous composition having from 10 to 60 percent by weight of residues of a vinyl monomer bonded by carbon-to-carbon bonds to residues of a flexible polyester-polyether copolymer which has been copolymerized through internal olefinic unsaturation with the unsaturated linkage of said vinyl monomer, said polyester-polyether copolymer before copolymerization with said vinyl monomer having a molecular weight of at least 2000 and having a ratio of weight-average molecular weight to number-average molecular weight of less than 1.5 and consisting essentially of linear polymer chains joined through linkages selected from the group consisting of ester and ether linkages to residues of a polymerization starter selected from the group consisting of aliphatic alcohols having from one to 18 carbon atoms and from one to 8 hydroxyl groups, and organic carboxylic acids having from one to 54 carbon atoms and one to four carboxyl groups, said polymer chains being substantially composed of the essential repeating units

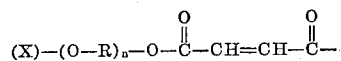

and

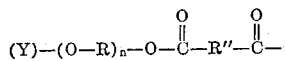

wherein R is selected from the group consisting of 1,2-ethylene, 1,2-propylene, and 1,2-butylene, $n$ is a positive integer having a value varying from one to about 10, with the average value of $n$ varying from at least 2.0 to about 4, and

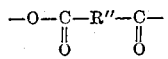

is a radical derived from an acid

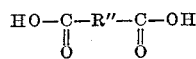

capable of forming a cyclic anhydride and having from 4 to 16 carbon atoms and from zero to 6 halogen substituents selected from the group consisting of chloro and bromo radicals, said (X) units being present in an amount such that the mol ratio $(X)/(X)+(Y)$ equals at least 0.25, said cured resinous composition having a Shore A hardness of at least 85 and a notched Izod impact strength of at least about 0.5 ft.-lb. per inch of notch, and with the said vinyl monomer being selected from the group consisting of styrene, alpha-methyl styrene, vinyl toluene, methyl divinyl benzene, triallyl cyanurate, and diallyl phthalate.

4. The cured resinous composition of claim 3 having a Shore A hardness of at least 90.

5. The cured resinous composition of claim 3 having an Izod impact strength of at least 1.0 ft.-lb. per inch of notch.

6. The cured resinous composition of claim 3 in which the said ethylenically unsaturated polyester-polyether copolymer before copolymerization with said vinyl monomer has a bulk viscosity of less than 1,000,000 centipoises at room temperature.

7. The cured resinous composition of claim 3 in which R″ is 1,2-phenylene.

8. The cured resinous composition of claim 3 in which R″ is 3,4,5,6-tetrahydro-1,2-phenylene.

9. The cured resinous composition of claim 3 in which R″ is 3,4,5,6-tetrachloro-1,2-phenylene.

10. The cured resinous composition of claim 3 in which R″ is 3,4,5,6-tetrabromo-1,2-phenylene.

11. The cured resinous composition of claim 3 in which R″ is 1,4, 5,6,7,7-hexachlorobicyclo-(2,2,1)-2,3-heptenylene-5.

12. The cured resinous composition of claim 3 in which the said ethylenically unsaturated polyester-polyether copolymer before copolymerization with said vinyl monomer has a molecular weight of at least 4000.

13. A cured, cross-linked, tough resinous composition having from 10 to 60 percent by weight of residues of a vinyl monomer bonded by carbon-to-carbon bonds to residues of a flexible polyester-polyether copolymer which has been copolymerized through internal olefinic unsaturation with the unsaturated linkage of said vinyl monomer, said polyester-polyether copolymer before copolymerization with the said vinyl monomer having a molecular weight of at least 2000 and consisting essentially of linear polymer chains joined through linkages selected from the group consisting of ester and ether linkages to residues of a polymerization starter selected from the group consisting of water, aliphatic alcohols having from one to 18 carbon atoms and from one to 8 hydroxyl groups, and organic carboxylic acids having from one to 54 carbon atoms and one to four carboxyl groups, said polymer chains being substantially composed of the essential repeating units

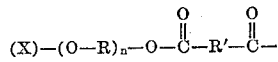

and

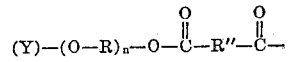

wherein R is selected from the group consisting of 1,3-trimethylene, 2,2-dimethyl-1,3-trimethylene, and 2,2-(bis-chloromethyl)-1,3-trimethylene, $n$ is a positive integer having a value varying from one to about 10, with the average value of $n$ varying from at least 2.0 to about 4, R′ is selected from the group consisting of —CH=CH— and

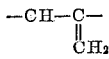

and R″ is selected from the group consisting of 1,2-phenylene, 3,4,5,6 - tetrahydro-1,2 - phenylene, 3,4,5,6-tetrachloro-1,2-phenylene, 3,4,5,6-tetrabromo-1,2-phenylene, 1,4,5,6,7,7-hexachlorobicyclo - (2,2,1)-2,3-heptenylene-5, and 2,2′-biphenylene, said (X) units being present in an amount such that the mol ratio $(X)/(X)+(Y)$ equals at least 0.25.

14. The process of preparing the cured, cross-linked, tough resinous composition of claim 1 which consists of copolymerizing by free-radical initiation the said vinyl monomer with the said olefinically unsaturated polyester-polyether copolymer.

15. The process of preparing the cured, cross-linked, tough resinous composition of claim 3 which consists of copolymerizing by free-radical initiation the said vinyl monomer with the said olefinically unsaturated polyester-polyether copolymer.

16. A cured, cross-linked, resinous composition prepared by copolymerizing by free-radical initiation a free-radically reactive vinyl monomer with a mixture consisting of from 10 to 90 weight percent of the ethylenically unsaturated polyester-polyether copolymer described in claim 1 and from 90 to 10 weight percent of a rigid polyester prepared by polycondensation of (1) an unsaturated aliphatic acid selected from the group consisting of maleic acid, fumaric acid, and itaconic acid, (2) an aromatic dicarboxylic acid selected from the group consisting of phthalic acid and isophthalic acid, and (3) glycols selected from the group consisting of ethylene glycol, propylene glycol, diethylene glycol and dipropylene glycol.

17. The cured resinous composition of claim 1 in which the said ethylenically unsaturated polyester-polyether copolymer before copolymerization with the said vinyl monomer has a molecular weight of at least 4000.

18. The product of claim 3 in which the polymer chains of the said ethylenically unsaturated polyester-polyether copolymer are joined to residues of an aliphatic monoalcohol having from one to 18 carbon atoms, and R″ is selected from the group consisting of 1,2-phenylene, 3,4,5,6-tetrahydro-1,2-phenylene, 3,4,5,6-tetrachloro-1,2-phenylene, 3,4,5,6-tetrabromo-1,2-phenylene, and 1,4,5,6,7,7-hexachlorobicyclo-(2,2,1)-2,3-heptenylene-5.

19. The product of claim 3 in which the polymer chains of the said ethylenically unsaturated polyester-polyether copolymer are joined to residues of a monobasic organic carboxylic acid having from one to 18 carbon atoms, and R″ is selected from the group consisting of 1,2-phenylene, 3,4,5,6-tetrahydro-1,2-phenylene, 3,4,5,6-tetrachloro-1,2-phenylene, 3,4,5,6-tetrabromo-1,2-phenylene, and 1,4,5,6,7,7-hexachlorobicyclo-(2,2,1)-2,3-heptenylene-5.

20. A cured, cross-linked, resinous composition having from 10 to 60 percent by weight of residues of a vinyl monomer bonded by carbon-to-carbon bonds to residues of a flexible polyester-polyether copolymer which has been copolymerized through internal olefinic unsaturation with the unsaturated linkage of said vinyl monomer, said olefinically unsaturated polyester-polyether copolymer before copolymerization with said vinyl monomer having a molecular weight of at least 2000 and consisting essentially of linear polymer chains joined through linkages selected from the group consisting of thioether and thioester linkages to residues of a polymerization starter selected from the group consisting of hydrogen sulfide and organic compounds having at least one sulfhydryl radical, said polymer chains being substantially composed of the essential repeating units

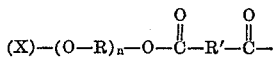

and

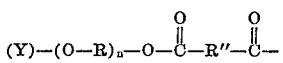

wherein R is selected from the group consisting of 1,2-alkylene and 1,3-alkylene radicals having at least two and not more than 6 carbon atoms, $n$ is a positive integer having a value varying from one to about 10, with the average value of $n$ varying from at least 2.0 to about 4, R′ is selected from the group consisting of —CH=CH— and

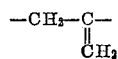

and

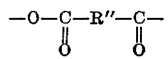

is a radical derived from an acid

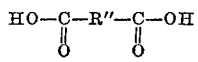

capable of forming a cyclic anhydride and having from 4 to 16 carbon atoms and from zero to six halogen atoms, said (X) units being present in an amount such that the mol ratio $(X)/(X)+(Y)$ equals at least 0.25.

21. The composition of claims 20 in which said R is selected from the group consisting of 1,2-ethylene, 1,2-propylene, and 1,2-butylene, R′ is —CH=CH—, R″ is selected from the group consisting of 1,2-phenylene, 3,4,5,6-tetrahydro-1,2-phenylene, 3,4,5,6-tetrachloro-1,2-phenylene, 3,4,5,6-tetrachloro-1,2-phenylene, and 1,4,5,6,7,7-hexachlorobicyclo-(2,2,1)-2,3-heptenylene-5, and said vinyl monomer is selected from the group consisting of styrene, alphamethyl styrene, vinyl toluene, methyl methacrylate, divinyl benzene, triallyl cyanurate, and diallyl phthalate.

22. A cured, cross-linked, resinous composition having from 10 to 60 percent by weight of residues of a vinyl monomer bonded by carbon-to-carbon bonds to residues of a flexible polyester-polyether copolymer which has been copolymerized through internal olefinic unsaturation with the unsaturated linkage of said vinyl monomer, said olefinically unsaturated polyester-polyether copolymer before copolymerization with said vinyl monomer having a molecular weight of at least 2000 and having a ratio of weight-average molecular weight to number-average molecular weight of less than 1.5 and consisting essentially of linear polymer chains joined through linkages selected from the group consisting of ester and ether linkages to residues of the water polymerization starter, said polymer chains being essentially composed of the essential repeating units

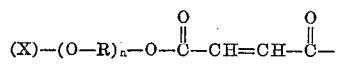

and

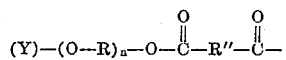

wherein R is selected from the group consisting of 1,2-ethylene, 1,2-propylene, and 1,2-butylene, and $n$ is a positive integer having a value varying from one to about 10, with the average value of $n$ varying from at least 2.0 to about 4, and R″ is a radical selected from the group consisting of 1,2-phenylene, 3,4,5,6-tetrahydro-1,2-phenylene, 3,4,5,6-tetrachloro-1,2-phenylene, 3,4,5,6-tetrabromo-1,2-phenylene, 1,4,5,6,7,7-hexachlorobicyclo-(2,2,1)-2,3-heptenylene-5, and 2,2′-biphenylene, said (X) units being present in an amount such that the mol ratio

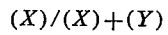

equals at least 0.25, said cured resinous composition having a Shore A hardness of at least 85.

23. The process of preparing the cured, cross-linked, tough resinous composition of claim 20 which consists of copolymerizing by free-radical initiation the said vinyl monomer with the said olefinically unsaturated polyester-polyether copolymer.

24. The process of preparing the cured, cross-linked, tough resinous composition of claim 22 which consists of copolymerizing by free-radical initiation the said vinyl monomer with the said olefinically unsaturated polyester-polyether copolymer.

25. A cured, cross-linked, resinous composition having from 10 to 60 percent by weight of residues of a vinyl monomer bonded by carbon-to-carbon bonds to residues of a flexible polyester-polyether copolymer which has been copolymerized through internal olefinic unsaturation with the unsaturated linkage of said vinyl monomer, said olefinically unsaturated polyester-polyether copolymer before copolymerization with said vinyl monomer having a molecular weight of at least 2000 and having a ratio of weight-average molecular weight to number-average molecular weight of less than 1.5, and consisting essentially of linear polymer chains joined through linkages selected from the group consisting of ester and ether linkages to residues of a polymerization starter consisting of aliphatic alcohols having from one to 18 carbon atoms and from one to 8 hydroxyl groups, and organic carboxylic acids having from one to 54 carbon atoms and one to four carboxyl groups, said polymer chains being essentially composed of the essential repeating units

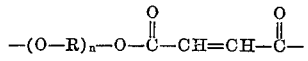

wherein R is selected from the group consisting of 1,2-ethylene, 1,2-propylene, and 1,2-butylene, and $n$ is a positive integer having a value varying from one to about 10, with the average value of $n$ varying from at least 2.0 to about 4, said cured resinous composition having a Shore A hardness of at least 85 and a notched Izod impact strength of at least about 0.5 ft.-lb. per inch of notch, and with the said vinyl monomer being selected from the group consisting of styrene, alpha-methyl styrene, vinyl toluene, methyl methacrylate, divinyl benzene, triallyl cyanurate, and diallyl pthalate.

26. The process of preparing the cured, cross-linked, tough resinous composition of claim 25 which consists of copolymerizing by free-radical initiation the said vinyl monomer with the said olefinically unsaturated polyester-polyether copolymer.

References Cited

UNITED STATES PATENTS

| | | | |
|---|---|---|---|
| 2,822,350 | 2/1958 | Hayes | 260—78.4 |
| 3,089,863 | 5/1963 | Hicks et al. | 260—75 |
| 3,160,679 | 12/1964 | Lew | 260—861 |
| 3,213,067 | 10/1965 | Pohl et al. | 260—78.4 |
| 3,214,491 | 10/1965 | Stanton | 260—871 |
| 3,257,477 | 6/1966 | Hedrick | 260—861 |
| 2,962,524 | 11/1960 | Hostettler et al. | 260—484 |
| 3,254,060 | 5/1966 | Connolly et al. | 260—2 |

FOREIGN PATENTS

| | | |
|---|---|---|
| 1,294,986 | 4/1962 | France. |
| 500,300 | 2/1939 | Great Britain. |
| 819,684 | 9/1959 | Great Britain. |

MURRAY TILLMAN, *Primary Examiner.*

J. T. GOOLKASIAN, *Assistant Examiner.*